(12) United States Patent
Natanzon et al.

(10) Patent No.: US 8,510,279 B1
(45) Date of Patent: Aug. 13, 2013

(54) USING READ SIGNATURE COMMAND IN FILE SYSTEM TO BACKUP DATA

(75) Inventors: Assaf Natanzon, Tel Avi (IL); Zvi Gabriel BenHanokh, Tel Aviv (IL)

(73) Assignee: EMC International Company, Hamilton (BM)

( * ) Notice: Subject to any disclaimer, the term of this patent is extended or adjusted under 35 U.S.C. 154(b) by 0 days.

(21) Appl. No.: 13/421,081

(22) Filed: Mar. 15, 2012

(51) Int. Cl.
G06F 7/00 (2006.01)
G06F 17/00 (2006.01)
G06F 17/30 (2006.01)
G06F 9/26 (2006.01)

(52) U.S. Cl.
USPC ........... 707/697; 707/698; 707/699; 707/704; 711/216

(58) Field of Classification Search
USPC ............. 707/2, 203; 711/154, 165; 380/269; 370/235
See application file for complete search history.

(56) References Cited

U.S. PATENT DOCUMENTS

| | | | |
|---|---|---|---|
| 5,822,780 A * | 10/1998 | Schutzman | 711/165 |
| 8,300,823 B2 * | 10/2012 | Bojinov et al. | 380/269 |
| 2005/0004954 A1 * | 1/2005 | Soule, III | 707/203 |
| 2005/0022107 A1 | 1/2005 | Dey et al. | |
| 2009/0125504 A1 | 5/2009 | Adams et al. | |
| 2009/0132616 A1 | 5/2009 | Winter et al. | |
| 2009/0171885 A1 * | 7/2009 | Silberstein et al. | 707/2 |
| 2011/0196900 A1 | 8/2011 | Drobychev et al. | |
| 2011/0202732 A1 * | 8/2011 | Montgomery | 711/154 |
| 2011/0242979 A1 * | 10/2011 | Feroz et al. | 370/235 |

OTHER PUBLICATIONS

Office Action; dated Mar. 21, 2013; for U.S. Appl. No. 13/421,062 14 pages.

* cited by examiner

*Primary Examiner* — Susan Chen
(74) *Attorney, Agent, or Firm* — Daly, Crowley, Mofford & Durkee, LLP

(57) ABSTRACT

In one aspect, a method includes determining locations in a file that have changed using read signature commands, reading data around a changed file location for each file location that has changed, generating variable-size portions of the data read and sending the variable-size portions of the data to a backup system.

19 Claims, 8 Drawing Sheets

US 8,510,279 B1

USING READ SIGNATURE COMMAND IN FILE SYSTEM TO BACKUP DATA

BACKGROUND

Computer data is vital to today's organizations and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Another conventional data protection system uses data replication, by creating a copy of production site data of an organization on a secondary backup storage system, and updating the backup with changes. The backup storage system may be situated in the same physical location as the production storage system, or in a physically remote location. Data replication systems generally operate either at the application level, at the file system level, or at the data block level.

SUMMARY

In one aspect, a method includes determining locations in a file that have changed using read signature commands, reading data around a changed file location for each file location that has changed, generating variable-size portions of the data read and sending the variable-size portions of the data to a backup system.

In another aspect, an article includes a non-transitory machine-readable medium that stores executable instructions. The instructions cause a machine to determine locations in a file that have changed using read signature commands, read data around a changed file location for each file location that has changed, generate variable-sized portions of the data read and send the variable-size portions of the data to a backup system.

In a further aspect, an apparatus includes circuitry configured to determine locations in a file that have changed using read signature commands, read data around a changed file location for each file location that has changed, generate variable-sized portions of the data read and send the variable-size portions of the data to a backup system.

DETAILED DESCRIPTION

Figure 1:
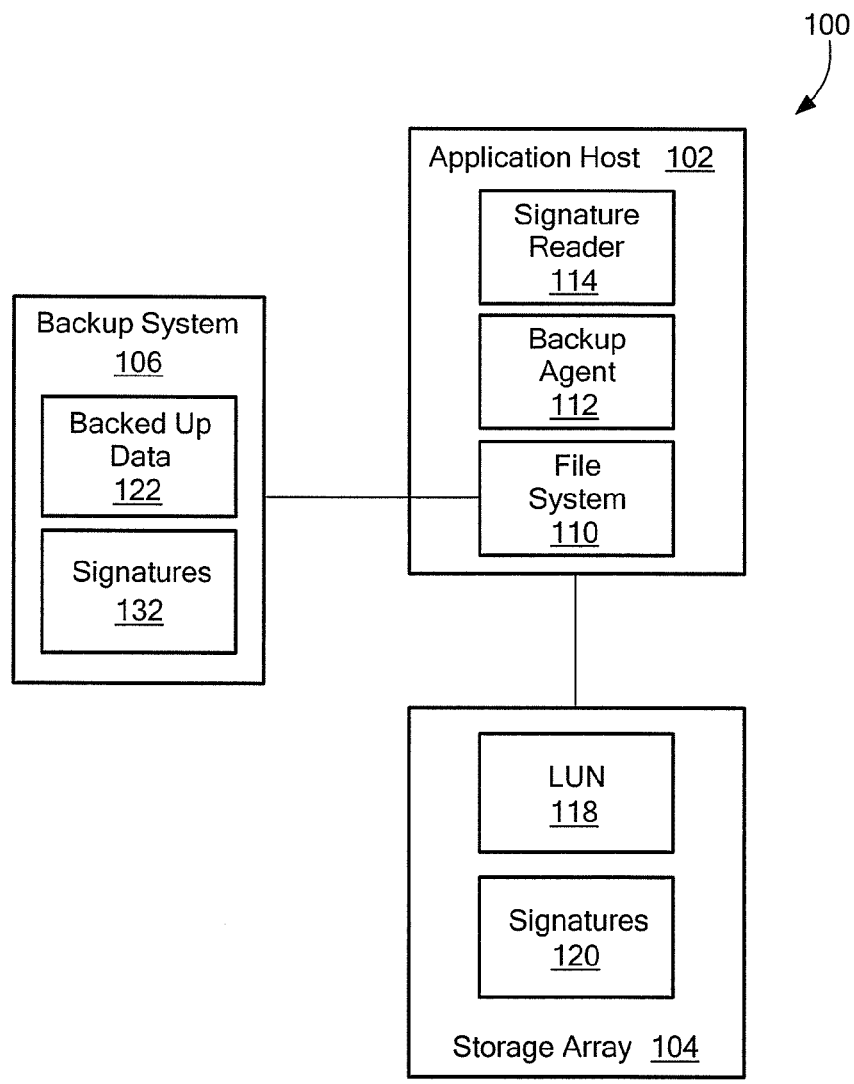
FIG. 1 is a block diagram of an example of a system to backup a file using a read signature command.

Described herein are techniques to use a read signature command to determine which portions of a file have changed and backing up data corresponding to those portions that have changed. A read signature command may be used to compare two signatures of two sets of data and provides a way to determine if the two sets of data are equivalent. Thus, a large file that has one or two bytes of data that have changed does not require that the entire file be backed up. In addition, the entire file does not need to be read to determine if the file has been changed; but rather, the signatures for the blocks of the file in the backend storage are read. Thus, in a deduplicated backup environment a significant amount of time and bandwidth may be saved by using a read signature command.

A signature is applied to a group of data and is unique to a group of data. If the group of data changes, then its corresponding signature changes. In one example, a data file includes a number of signatures where each signature corresponds to a unique set of data. In some examples, the signature may be calculated and stored with the data. In alternative examples, multiple signatures may be stored for data, each signature representing a different granularity of the data (e.g., there may be a signature for every 16 kilobyte portion of the data as well as a signature for a 1 megabyte portion of the data). In certain examples, when signatures are stored within a block device, the read signature command may be implemented as a SCSI command to the block device.

A read signature command to a block device can be used to determine if a file residing in a file system stored on the block device has changed by reading the signatures for the blocks where the file is stored.

By using a read signature command one can determine if a file has changed even if a file is defragmented since signatures are tied to the corresponding data.

In alternative examples, the signature may be performed on data of different block sizes. In some examples, the signatures may be of size 8 kilobytes. In other examples, the signature size may be 16 kilobytes. In further examples, the signature size may be 1 megabyte. The signatures kept in the storage device are usually fixed and not variable size, e.g. if the signature size is 8 KB, then each signature will start with an 8 KB alignment.

The signatures may be kept in the block device storing a file system, and thus the signatures will be aligned to the block device blocks.

In one particular example, a read signature command may include one or more of the following parameters:

1. LBA (logical block address) for the target of the read
2. Number of blocks of the JO
3. Signature granularity The resultant hash value of each signature command will be a 16 or 32 bytes hash value (or signature), for each signature granularity block (e.g., if the granularity is 16 blocks and 64 blocks are written, then there will be 4 signatures each of 16 or 32 bytes).

In another example the signatures may be stored at the file system level. That is, the signatures will be stored or calculated at a sub-file granularity. In this example, the read signature may be a proprietary command over IP or an extension to NFS or CIFS, which will read a signature using the following parameters:

1. File name
2. File offset
3. Signature granularity

In some examples, the read signature command may contain offsets and lengths of the data. In still further examples, the read signature commands may be used to verify data during a disaster recovery. In some examples, a read signature for a large data block may be used when the majority of the data is the same. In other examples, when the signatures of large data blocks on the replication and production site are found to not be the same, smaller read signatures may be used to determine what portion of the data is out of sync.

The description thus far addresses using a read signature in a replication environment. As will be further discussed a read signature may also be used in a backup environment where a user wants to backup a file to a deduplication device without the need to read all the data in the file.

Referring to FIG. 1, a system 100 is an example of a system for which read signature commands may be used to backup data from a file in a file system. The system 100 includes an application host 102, a storage array 104 and a backup system 106 used to backup the files from the storage array 104. The storage array 106 includes storage block devices (e.g., a logical unit (LUN) 118) and signatures 120. For example, the signatures 120 correspond to data in the LUN 118. The backup system 106 (e.g., a deduplication device) includes backed up data 122 from the file system 110 (e.g., from the storage array 104) and signatures 132 corresponding to the data in the backed up data 122. For instance, the signatures 132 are not kept in the backup system 106 by file; but rather, for global use. For example, if two files contain the same portion of data, only one copy of the portion of data and one copy of the signature are kept, and each file structure will contain a pointer to the data.

The application host 102 includes a file system 110, a backup agent 112 and a signature reader 114. The backup agent 112 controls the process to backup files from the file system 110 to the backup system 106. The backup agent 112 backs up the file system 110 using a read signature command which implemented by signature reader 114 to read the signatures 120, 132 to determine if two signatures corresponding to the same portion of data are different.

The signatures 120 are signatures for blocks in the LUN 118 and each signature can be a signature for 4 kilobytes or 8 kilobytes of data, for example. The signature size is calculated so that a signature assigns the size of a block in the file system. For example, since most file system use a block size of 4 KB or 8 KB, thus it is desirable to configure the backend storage to keep signatures at 4 KB granularity. The file system 110 stores the file on LUN 118. Each file is written in a set of basic file system blocks. If the file system blocks are aligned with the storage blocks (as in most cases), the file system 110 may read a signature for each block of a file as a signature which is saved on the disk. In other examples, the signatures are not kept on the backend storage array 104 and are generated on demand when the read signature command arrives at the storage array 104. In this example, the data blocks may be unaligned as the storage reads the data when the read commands arrive. This method is less efficient than saving signatures within the storage, but this method still saves bandwidth between the application host and the storage 104.

Figure 2A:
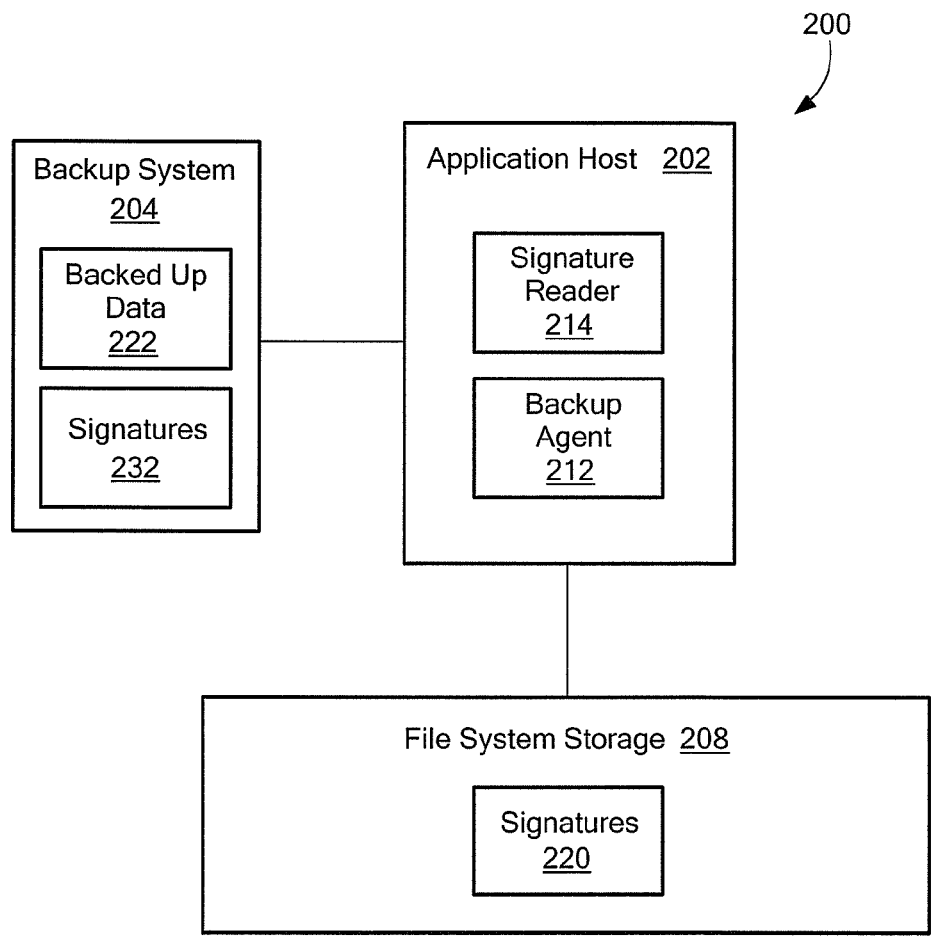
FIGS. 2A and 2B are block diagrams of other examples of systems to backup a file using a read signature command.

Referring to FIG. 2A, a system 200 is another example of a system for which read signature commands may be used to backup data from a file system. The system 200 includes an application host 202, a file system storage 208 and a backup system 204 used to save the files from the file system storage 208. The file system storage 208 includes signatures 220. For example, the signatures 220 correspond to data in the file system storage 208. The backup system 204 (e.g., a deduplication device) includes backed up data 222 from the file system storage 208 and signatures 232 corresponding to the data in the backed up data 222. In this example, the signatures may be stored aligned to the files system and files and not in a block storage as in the previous command, the signature reader may use a proprietary read signature protocol with the file system storage to read the signatures (and not a SCSI read signature command as in the block storage use case).

The application host 202 includes a backup agent 212 and a signature reader 214. The backup agent 212 controls the process to backup files from the file system storage 208 to the backup system 204. The backup agent 212 uses the file system 208 to execute a read signature command which uses the signature reader 214 to read the signatures 220, 232 to determine if two signatures corresponding to the same portion of data are different. In one example, the read signature command may be implemented over a proprietary IP protocol. In other examples the command may be extension to the CIFS or NFS protocols.

Figure 2B:
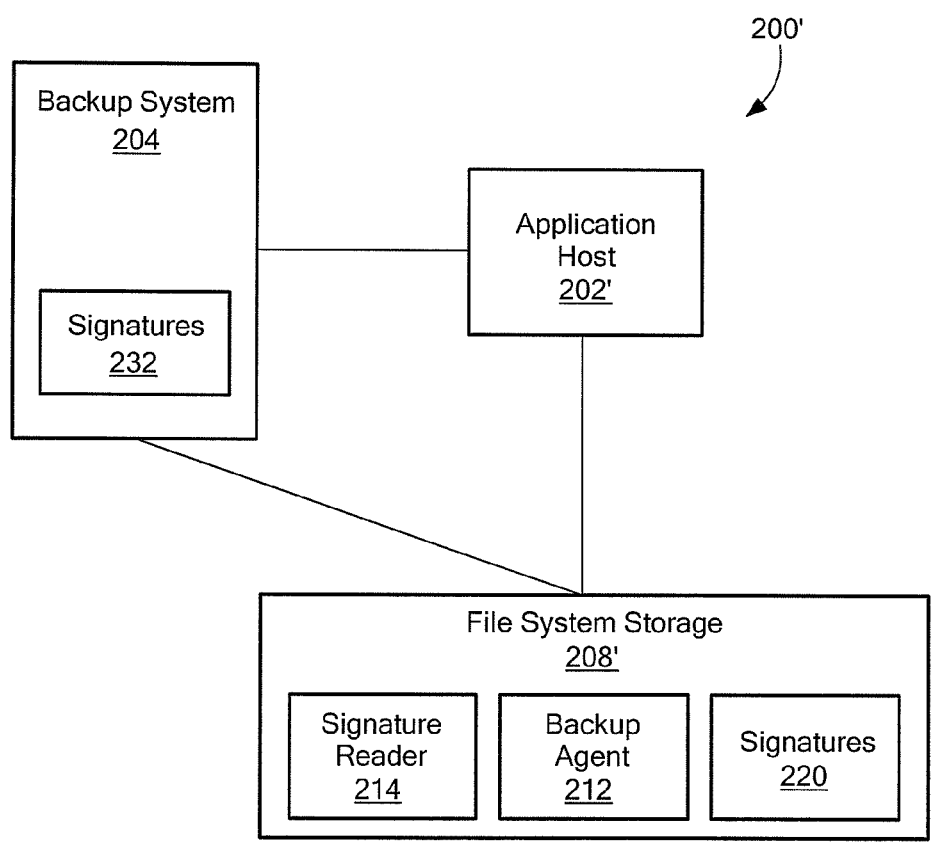

Referring to FIG. 2B, a system 200' is similar to the system 200 except an application host 202' does not include the signature reader 214 and the backup agent 212 which are instead included in a file system 208'.

Figure 3:
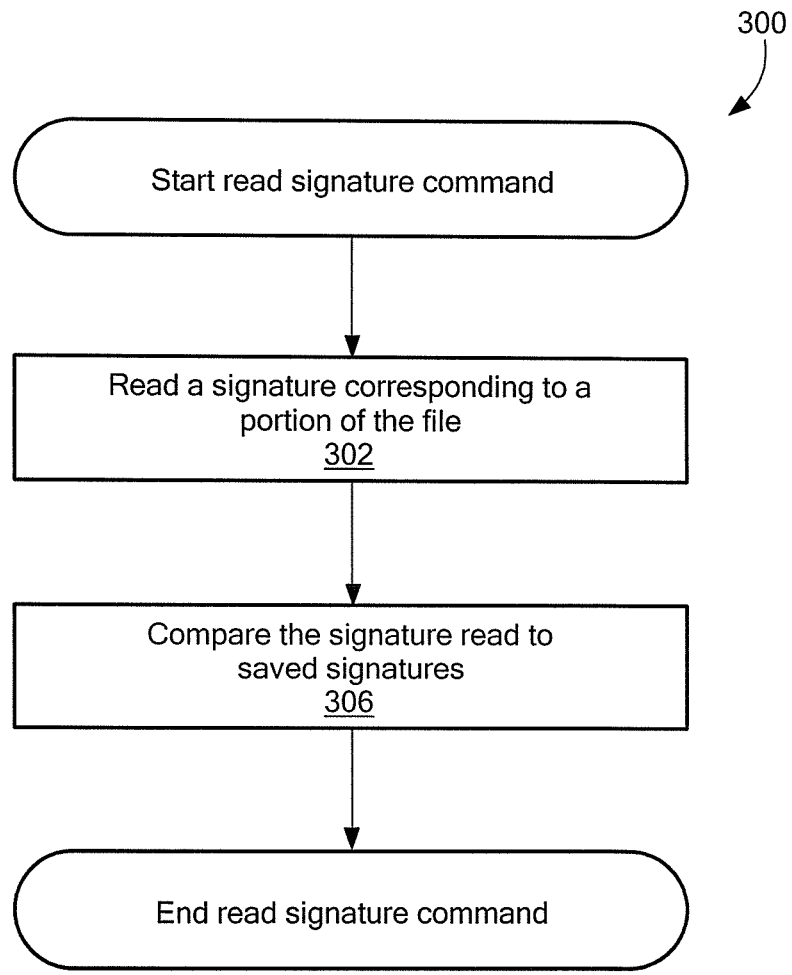
FIG. 3 is a flowchart of an example of a process used by a read signature command.

Referring to FIG. 3, an example of a process used by a read signature command to determine changes in a portion of a file is a process 300. Process 300 reads a signature for a portion of a file (302) and compares the signature read to a set of saved signatures (306). For example, the read signature command is used to read a signature for a portion of the file from the signatures 120 (FIG. 1) and compares the signature to the signatures 132 (see FIG. 1) and determines if any one of the signatures 132 are the same.

There are two types of deduplication methods: fixed-size deduplication and variable-size deduplication. Fixed-size deduplication divides a file in to predetermined portion sizes, for example, 4 kilobytes, and for each portion a pointer is stored if the portion is identical to what has already been stored. Otherwise, the entire portion of the data is stored. Variable-size deduplication divides the files in to variable sizes. The places where the file is divided are calculated using a hash function. Variable-size deduplication is useful when portions of the file are moved for instance because of the addition of a few characters to a text file.

Figure 4:
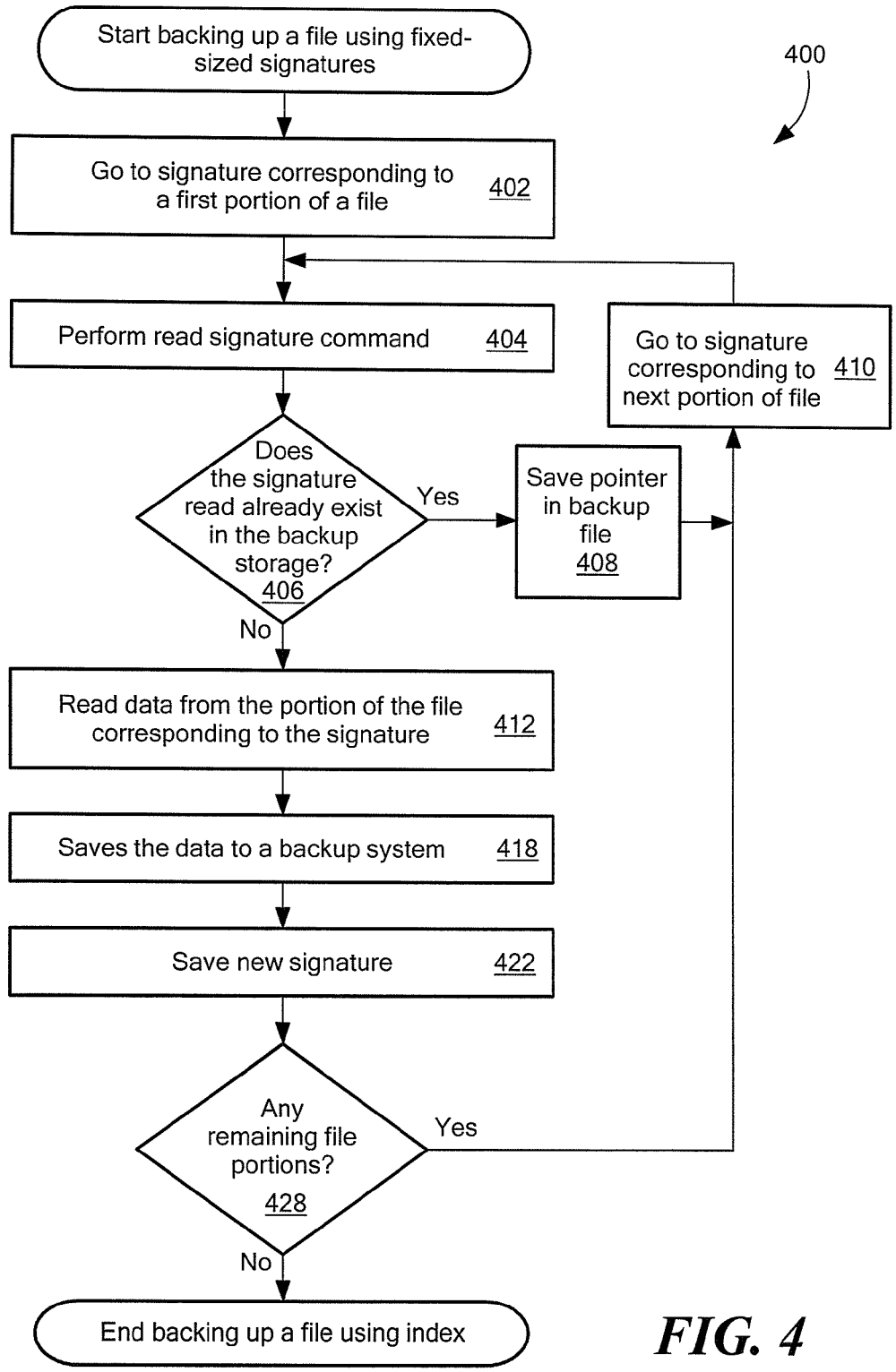
FIG. 4 is a flowchart of an example of a process to backup a file using a read signature command for fixed-size signatures.

Referring to FIG. 4, an example of a process to backup a file in a deduplication backup system that uses fixed-size signatures with a read signature command is a process 400. Process 400 starts to backup first portion of a file (402) and performs a read signature command corresponding to that portion of the file (404). For example, the process 400 performs the process 300 described in FIG. 3 by reading the signature (302) and checks if the signature is already stored in the backup storage (306). The portion of file with the identical signature does not need to be the same file being backed-up. For example, an identical signature may be found in a previous copy of another file and thus that portion of the file does not need to be backed-up again.

Process 400 determines if the signature read already exists in the backup storage (406). If the read signature already exists, process 400 saves a pointer in the backup copy of the file in the backup storage which points to the data corresponding to the already existing matching signature (408). Process 400 reads the signature corresponding to the next file location (410) and repeats the processing blocks 404 and 406.

If the read signature does not exist in the backup storage, process 400 reads the data from the portion of the file corresponding to the signature (412) and saves the data to a backup system (418). The new signature of the new data portion is also saved in the backup system (422). Process 400 determines if there are any remaining file portions and if there are remaining file portions, process 400 performs processing blocks 408, 404 and 406.

When a deduplication system uses variable length signatures process 400 may not work as well. For instance, if the data of a file was offset by 1 byte, the signatures will be completely different since the signatures which are kept in the storage array are block aligned. In many systems, for instance, data base systems and virtual machines, the files are very large and usually there are no additional characters added in the middle of a file. Thus, the process 400 works well. In this case the file will be backed up to the backup device using variable length deduplication, but for each file it will also keep the block aligned signature for the file in the list of signatures with a pointer to the file.

In one particular example, a file X is 16 kilobytes and each fixed length signature is 4 kilobytes in length so that file X has four fixed length signatures: $S_1$ for the first 4 kilobytes; $S_2$ for the second 4 kilobytes; $S_3$ for the third 4 kilobytes and $S_4$ for the fourth 4 kilobytes Each variable length signature may be on average size of 4 kilobytes so we may have any number of variable length signature, for example, say $L_1, L_2, L_3, L_4, L_5$ of sizes 1 kilobyte, 2 kilobytes, 3 kilobytes, 5 kilobytes and 5 kilobytes. In one example, f one byte at an offset 5 KB is changed, then the signatures S2 and L3 will change. In another example, if a byte at offset 6 kilobytes is added, then the file size of file X is now 16 kilobytes plus 1 byte. Thus, fixed signatures $S_2$, $S_3$, and $S_4$ will change and a new fixed length signature, $S_5$ is added. The variable signature length signature $L_3$ will also change.

Figure 5:
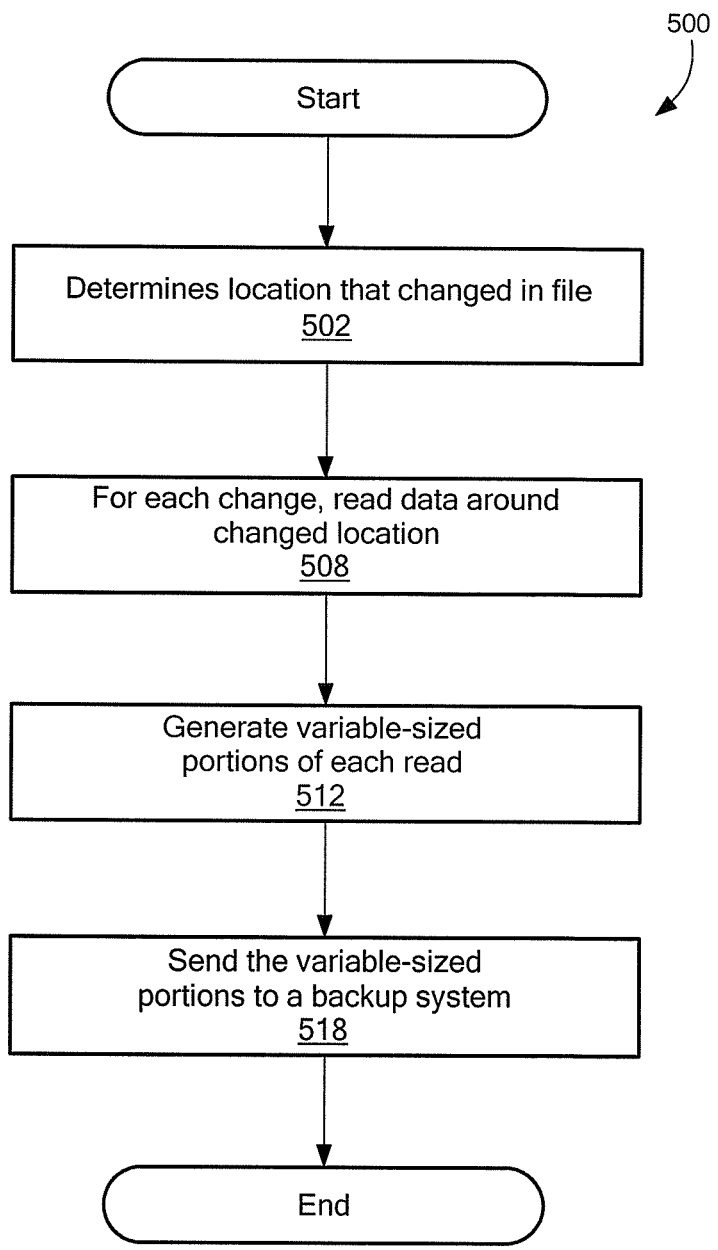
FIG. 5 is a flowchart of another example of a process to backup a file using a read signature command for variable-size signatures.

Referring to FIG. 5, an example of a process to backup a file in a backup system that uses variable-sized signatures with read signature commands is a process 500. Process 500 determines locations in a file for which no fixed-sized signatures exists using read signature commands (502). For example, the process 300 is used. For each file location that has changed, process 500 reads around the section (508). For example, process 500 reads x kilobytes before the changed file location and x kilobytes after the changed file location. Process 500 generates variable-sized portions of data of each read in processing block 508 (512) and sends the variable-size portions of data to the backup system (518). The systems save the new variable-size signature as well as the new fixed-size signatures. In the case where a byte was added to the file, a lot of fixed signatures will change. Thus, the system will fall back to reading all the data for calculation of variable-size signatures. After backing up the file with the variable length, the backup system will also store all the fixed-size signatures of the file (as read from the storage using read signatures).

In one example, a process may used to determine that file probably had data added in the middle of the file and thus back-up transitions immediately to a standard variable length deduplication backup method without comparing the rest of the signatures.

Figure 6:
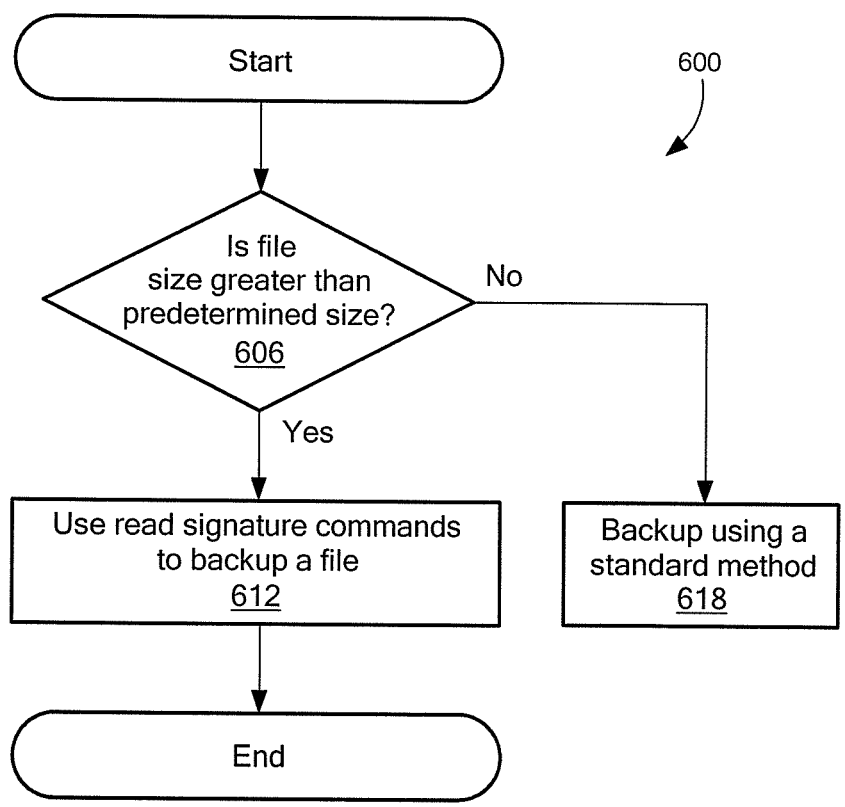
FIG. 6 is a flowchart of an example of a process to determine whether to use a read signature command to backup a file.

Referring to FIG. 6, an example of a process to determine whether to use a read signature process (e.g., the process 400 or the process 500) is a process 600. Process 600 determines if a file size is greater than a predetermined threshold (606). In one example, the predetermined threshold is 10 megabytes.

If the file is greater than a predetermined threshold, process 600 uses read signature commands to save the file to a backup system (612). For example, process 600 will perform process 400 or process 500. If the file is not greater than the predetermined threshold, backup of the data file is performed using a standard method (618). For example, the entire file is backed up.

Figure 7:
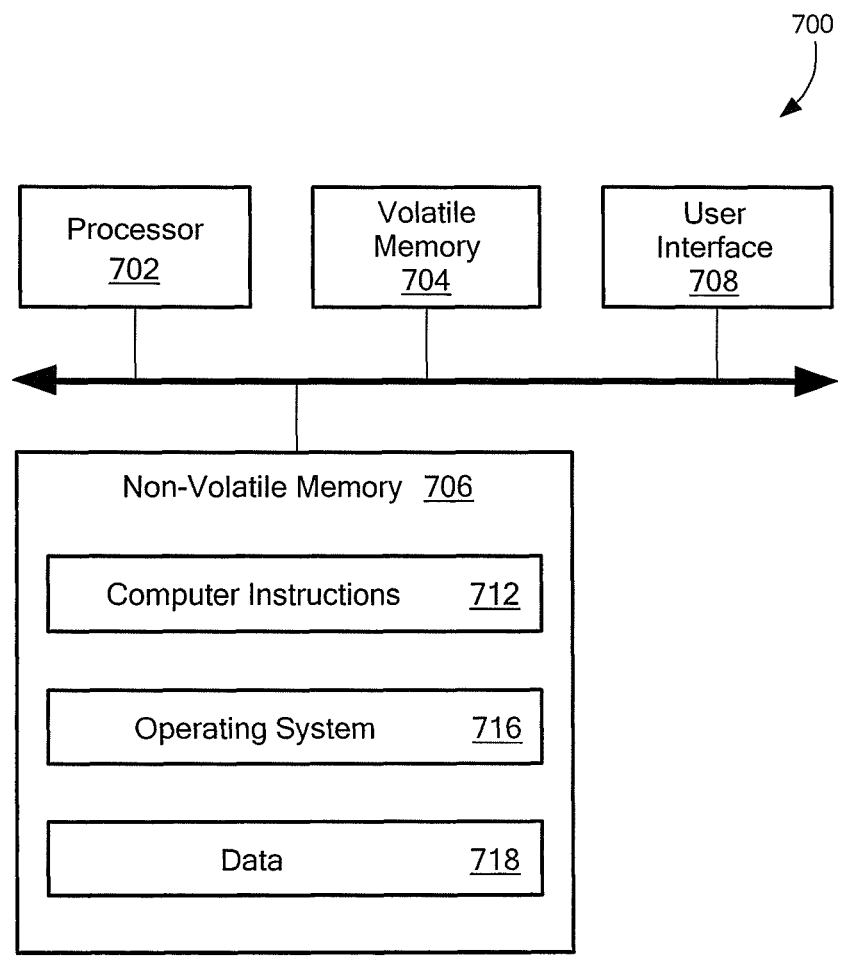
FIG. 7 is a computer on which any of the processes of FIGS. 3 to 6 may be implemented.

Referring to FIG. 7, an example of a backup agent (e.g., the backup agent 112, the backup agent 212) is a computer 700. The computer 700 includes a processor 702, a volatile memory 704, a non-volatile memory 706 (e.g., hard disk) and a user interface (UI) 708 (e.g., a mouse, a keyboard, a display, touch screen and so forth). The non-volatile memory 706 stores computer instructions 712, an operating system 716 and data 718. In one example, the computer instructions 712 are executed by the processor 702 out of volatile memory 704 to perform all or part of the processes described herein (e.g., processes 300 to 600).

The processes described herein (e.g., processes 300 to 600) are not limited to use with the hardware and software of FIG. 7; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform the processes described herein. The processes described herein may also be implemented as a machine-readable storage medium, configured with a computer program, where upon execution, instructions in the computer program cause the computer to operate in accordance with the processes.

The processes described herein are not limited to the specific examples described. For example, the processes 300 to 600 are not limited to the specific processing order of FIGS. 3 to 6, respectively. Rather, any of the processing blocks of FIGS. 3 to 6 may be re-ordered, combined or removed, performed in parallel or in serial, as necessary, to achieve the results set forth above.

The processing blocks (for example, in processes 300 to 600) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. A method comprising:
   determining locations in a file that have changed using read signature commands, a read signature command being configured to read a signature associated with a set of data, the signature being unique to the set of data and generated using a cryptographic algorithm, the read signature command comprising parameters comprising a logical block address for a target of the read, a number of blocks of an I/O request and a granularity of the signature;
   reading data around a changed file location for each file location that has changed using a computer central processor;
   generating variable-size portions of the data read; and
   sending the variable-size portions of the data to a backup system.

2. The method of claim 1 wherein reading data around a changed file location comprises reading data a fixed size before the changed file location and reading data the fixed size after the changed file location.

3. The method of claim 1, further comprising:
   storing in the backup system fixed-size signatures of the file; and
   using the fixed-size signatures when reading signatures using a read signature command.

4. The method of claim 3, further comprising:
   storing a changed portions of the file at the backup system if a variable-size signature does not match; and
   storing a pointer to the data corresponding to a portion of the file if the variable-size signature does match.

5. The method of claim 4, further comprising:
   storing a new fixed-size signature if a fixed-size signature has changed; and
   storing a new variable-size signature if the variable-size signature has changed.

6. The method of claim 1, further comprising storing variable-size signatures at the backup system.

7. An article comprising:
   a non-transitory machine-readable medium that stores executable instructions, the instructions causing a machine to:
      determine locations in a file that have changed using read signature commands, a read signature command being configured to read a signature associated with a set of data, the signature being unique to the set of data and generated using a cryptographic algorithm, the read signature command comprising parameters comprising a logical block address for a target of the read, a number of blocks of an I/O request and a granularity of the signature;
      read data around a changed file location for each file location that has changed;
      generate variable-size portions of the data read; and
      send the variable-size portions of the data to a backup system.

8. The article of claim 7 wherein the instructions causing the machine to read data around a changed file location comprises instructions causing the machine to read data a fixed size before the changed file location and read data the fixed size after the changed file location.

9. The article of claim 7, further comprising instructions causing the machine to:
   store in the backup system fixed-size signatures of the file; and
   use the fixed-size signatures when reading signatures using a read signature command.

10. The article of claim 7, further comprising instructions causing the machine to:
    store a changed portion of the file at the backup system if the variable-size signature does not match; and
    store a pointer to the data corresponding to a portion of the file if the variable-size signature does match.

11. The article of claim 10, further comprising instructions causing the machine to:
    store a new fixed-size signature if a fixed-size signature has changed; and
    store a new variable-size signature if the variable-size signature has changed.

12. The article of claim 11, further comprising instructions causing the machine to store variable-size signatures at the backup system.

13. An apparatus, comprising:
    hardware circuitry configured to:
       determine locations in a file that have changed using read signature commands, a read signature command being configured to read a signature associated with a set of data, the signature being unique to the set of data and generated using a cryptographic algorithm, the read signature command comprising parameters comprising a logical block address for a target of the read, a number of blocks of an I/O request and a granularity of the signature;
       read data around a changed file location for each file location that has changed;
       generate variable-size portions of the data read; and
       send the variable-size portions of the data to a backup system.

14. The apparatus of claim 13 wherein the circuitry comprises at least one of a processor, a memory, programmable logic and logic gates.

15. The apparatus of claim 13 wherein the circuitry configured to read data around a changed file location comprises circuitry configured to read data a fixed size before the changed file location and read data the fixed size after the changed file location.

16. The apparatus of claim 13, further comprising circuitry configured to:
    store in the backup system fixed-size signatures of the file; and
    use the fixed-size signatures when reading signatures using a read signature command.

17. The apparatus of claim 13, further comprising circuitry configured to:
    store a changed portion of the file at the backup system if the variable-size signature does not match; and
    store a pointer to the data corresponding to a portion of the file if the variable-size signature does match.

18. The apparatus of claim 13, further comprising circuitry configured to:
    store a new fixed-size signature if a fixed-size signature has changed; and
    store a new variable-size signature if the variable-size signature has changed.

19. The apparatus of claim 13, further comprising circuitry configured to store variable-size signatures at the backup system.

* * * * *